US007555229B2

(12) United States Patent
Kendall et al.

(10) Patent No.: US 7,555,229 B2
(45) Date of Patent: Jun. 30, 2009

(54) MARKING DEVICE AND METHODS

(75) Inventors: David R. Kendall, Boise, ID (US); Patrick Dougherty, Boise, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 245 days.

(21) Appl. No.: 11/236,938

(22) Filed: Sep. 28, 2005

(65) Prior Publication Data

US 2007/0071463 A1 Mar. 29, 2007

(51) Int. Cl.
*G03G 15/00* (2006.01)
*G03B 17/02* (2006.01)

(52) U.S. Cl. ................................ 399/24; 399/13; 396/6

(58) Field of Classification Search ................... 399/13, 399/24, 25, 28; 396/6

See application file for complete search history.

(56) References Cited

U.S. PATENT DOCUMENTS 4,961,088 A 10/1990 Gilliland et al.
5,261,326 A * 11/1993 Michlin ...................... 101/483
5,283,613 A 2/1994 Midgley, Sr.
5,491,540 A 2/1996 Hirst
5,563,669 A * 10/1996 Stephenson, III .............. 396/6
5,758,224 A 5/1998 Binder et al.
5,930,553 A 7/1999 Hirst et al.
6,099,101 A * 8/2000 Maurelli et al. ................ 347/7
6,512,816 B1 1/2003 Panasik et al.
6,546,211 B1 4/2003 Shishikura
6,584,290 B2 6/2003 Kurz et al.
6,738,903 B1 5/2004 Haines
6,906,436 B2 6/2005 Jenson et al.
2003/0012586 A1 1/2003 Iwata et al.

FOREIGN PATENT DOCUMENTS

EP 0789322 8/1997

OTHER PUBLICATIONS

International Search Report for Application No. PCT/US2006/028947. Report issued Dec. 20, 2006.

* cited by examiner

*Primary Examiner*—David M Gray
*Assistant Examiner*—Joseph S Wong

(57) ABSTRACT

A portion of a replaceable component of an imaging device is selectively deformed or melted.

31 Claims, 8 Drawing Sheets

MARKING DEVICE AND METHODS

BACKGROUND

It is often desirable to have an indication of how long replaceable components of devices, such as print cartridges of printers, have been operated, such as for warranty purposes. There are various ways to estimate or determine how long replaceable components have been operated. For example, one common method relies on the date of sale of the replaceable component, kept track of by record keeping e.g., using receipts, by resellers or retailers that involves handling of additional materials. Another method involves attaching an electronic memory chip to the replaceable component, such chips generally cannot be read in the field, e.g., by resellers or retailers, so they do not help determine how long the replaceable component has been operated. Some replaceable components have been evaluated that would provide a mechanical indicator of how long they have been operated, but these devices are easy to reset (e.g., they do not prevent fraud), and they add cost to the replaceable components. Sample printing is one way to determine how long a print cartridge has been operated, but retailers and resellers are often hesitant to have a customer bring in sample pages, and retailers and resellers usually do not maintain printers in their facilities such that they can generate print samples from any cartridge that may be returned.

DETAILED DESCRIPTION

In the following detailed description of the present embodiments, reference is made to the accompanying drawings that form a part hereof, and in which are shown by way of illustration specific embodiments that may be practiced. These embodiments are described in sufficient detail to enable those skilled in the art to practice disclosed subject matter, and it is to be understood that other embodiments may be utilized and that process, electrical or mechanical changes may be made without departing from the scope of the claimed subject matter. The following detailed description is, therefore, not to be taken in a limiting sense, and the scope of the claimed subject matter is defined only by the appended claims and equivalents thereof.

Figure 1:
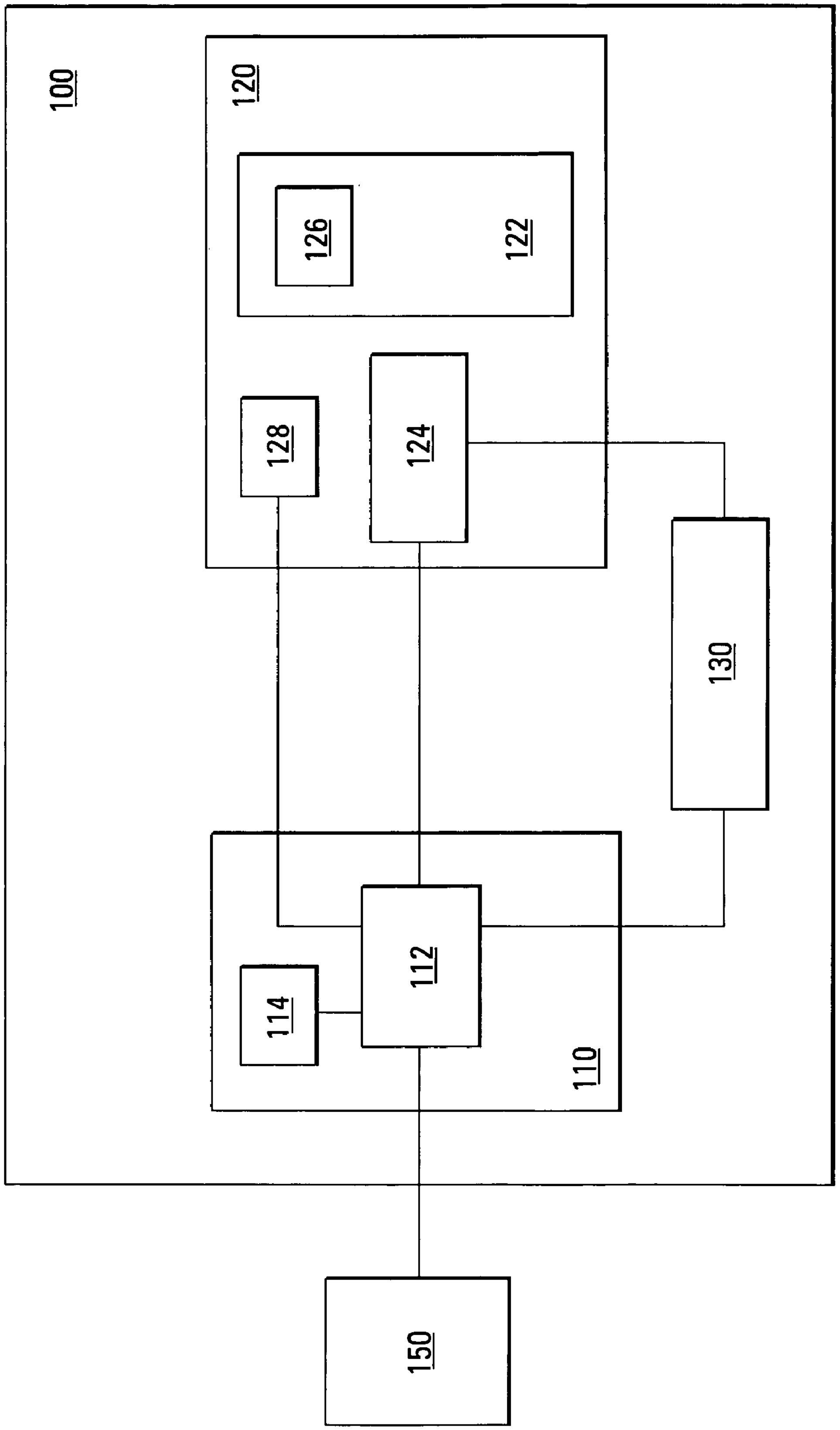
FIG. 1 is a block diagram of an embodiment of an imaging device, according to an embodiment of the disclosure.

FIG. 1 is a block diagram of an imaging device 100, such as an electrographic or ink-jet imaging device, according to an embodiment. Imaging device 100 can be a printer, a copier, digital network copier, a multi-function peripheral (MFP), a facsimile machine, etc. Imaging device 100 has a controller 110, such as a formatter, for interpreting image data and rendering the image data into a printable image. The printable image is provided to a print engine 120 to produce a hardcopy image on a media sheet. For one embodiment, print engine 120 includes a light source, such as a laser or light-emitting diodes or both, and is configured to receive a replaceable component 122, such as a toner cartridge, as is known for electrographic imaging devices, or a ink-jet cartridge, as is known for ink-jet imaging devices. For another embodiment, the imaging device 100 is capable of generating its own image data, e.g., a copier, via scanning an original hardcopy image.

For one embodiment, controller 110 includes local logic 112. Alternatively, local logic 112 may be separate from controller 110, and, for another embodiment, may be included in print engine 120. Local logic 112 is configured to control the application of power from a power supply 130 to a marker 124, adjacent replaceable component 122, for selectively activating and deactivating marker 124. For one embodiment, marker 124 may be part of print engine 120. Marker 124 selectively marks replaceable component 122 when selectively activated, e.g., upon receiving power from power supply 130. For another embodiment, local logic 112 activates and deactivates marker 124 based on information from a memory 114 that may part of controller 110, a memory 126 that may be a portion of removable component 122, or from sensors 128 that may be part of print engine 120 or a portion of replaceable component 122.

For some embodiments, local logic 112 may be configured to receive information from remote logic 150 (e.g., an external computer or other device). The information from remote logic 150 may be used by local logic 112 to make a decision regarding marking of replaceable component 122. For other embodiments, remote logic 150 may be configured to decide when replaceable component 122 is to be marked and thus the information from remote logic 150 may trigger local logic 112 into marking replaceable component 122 without requiring any significant additional decision processes.

For one embodiment memories 114 and 126 are computer-usable storage media that can be fixedly or removably attached to controller 110 and replaceable component 122, respectively. Some examples of computer-usable media include static or dynamic random access memory (SRAM or DRAM), read-only memory (ROM), electrically-erasable programmable ROM (EEPROM or flash memory), magnetic media and optical media, whether permanent or removable. For one embodiment, memories 114 and 126 contain computer-readable instructions to cause local logic 112 for causing marker 124 to mark replaceable component 122.

For one embodiment, marker 124 marks replaceable component 122 when replaceable component 122 reaches a predetermined state. For another embodiment, the predetermined state corresponds to a useful, limited and/or operable lifetime for replaceable component 122. For example, the predetermined state may correspond an amount of marking material remaining in a cartridge. In another example, the predetermined state may correspond to a predetermined amount of wear of wearable components of replaceable component 122, such as such as rollers, etc. Wear can be determined by the number of rotations the rollers have undergone, which may be stored in memory 114 and/or memory 126. For some embodiments, sensors 128 sense the occurrence of the predetermined state and send signals to local logic 112 indicative of the this occurrence. In turn, local logic 112 activates marker 124.

Figure 2:
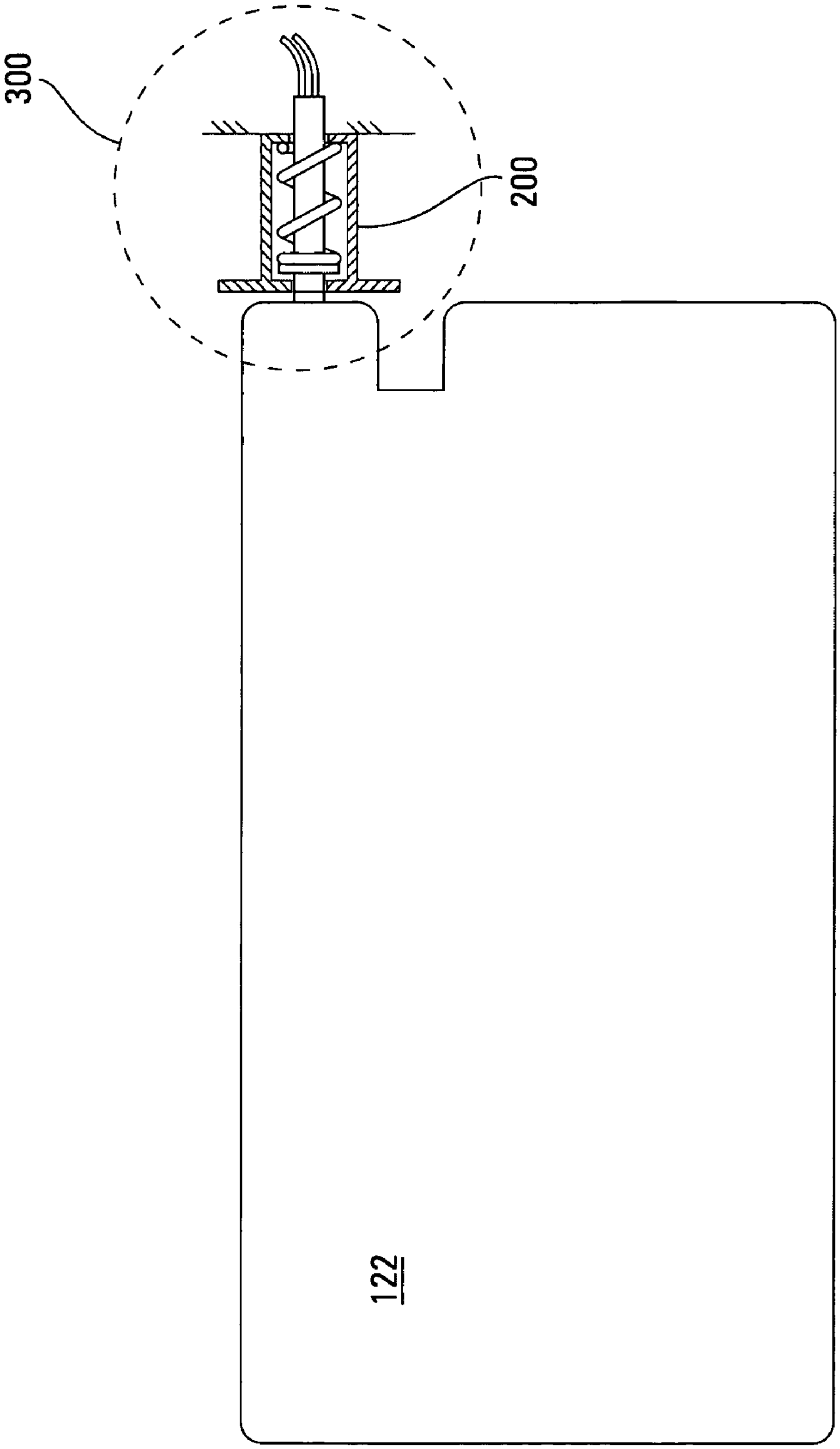
FIG. 2 illustrates an embodiment of a marking device, according to another embodiment of the disclosure.
Figure 3:
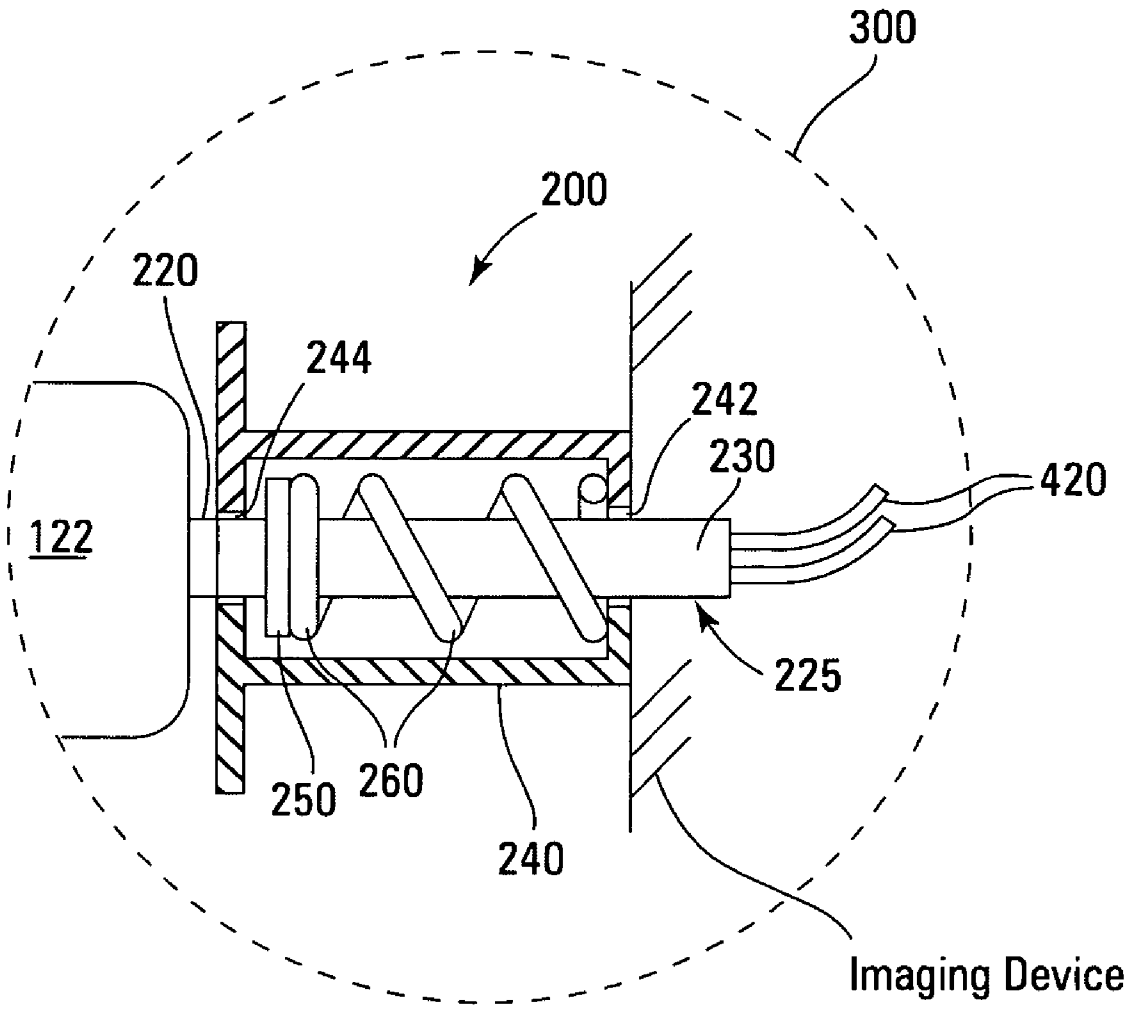
FIG. 3 is an enlarged view of a region 300 of FIG. 2.

FIG. 2 illustrates a marking device 200, according to an embodiment, for marking replaceable component 122. FIG. 3 is an enlarged view of region 300 of FIG. 2.

As shown in FIG. 3, marking device 200 includes a marker 225 that for one embodiment has heat-conducting plate 220, e.g., such as aluminum, copper, brass, bronze, or the like, as a portion of a heating element, disposed at an end of a conduit 230. For one embodiment, heat-conducting plate 220 forms a cap at the end of conduit 230, as shown in FIG. 3. For another embodiment, marker 225 passes through a housing 240 that is anchored to a portion of the imaging device, as shown in FIG. 3. Specifically, marker 225 passes through holes 242 and 244 formed through opposite ends of housing 240.

For one embodiment, a stop 250 is attached to an outer surface of conduit 230, e.g., such as a ring disposed around an outer curved surface of conduit 230 for an embodiment where conduit 230 has a cylindrical shape. For another embodiment, a spring 260, such as a coil spring, is located between stop 250 and an interior portion of housing 240 that surrounds hole 242, as shown in FIG. 3. Note that one end of spring 260 contacts stop 250, while an opposite end of spring 260 contacts the interior portion of housing 240 that surrounds hole 242. For another embodiment, spring 260 is wrapped around an exterior portion of conduit 230. In other words, a portion of conduit 230 passes through a center of spring 260. For one embodiment, spring 260 biases stop 250 against an interior portion of housing 240 surrounding hole 244 when replaceable component 122 is not disposed in or is removed from the imaging device and serves as an actuator for actuating marker 225.

When replaceable component 122 is installed in the imaging device, a portion of replaceable component 122, e.g., a plastic portion, engages heat-conducting plate 220 and pushes stop 250 away from the interior portion of housing 240 surrounding hole 244, as shown in FIG. 3, which compresses spring 260, so spring 260 forces the heating element against the portion of the replaceable component 122.

For an alternative embodiment, spring 260 may be omitted from marking device 200. For this embodiment, marking device 200 is oriented vertically above replaceable component 122 so that gravitational force biases the heating element against replaceable component 122.

Figure 4:
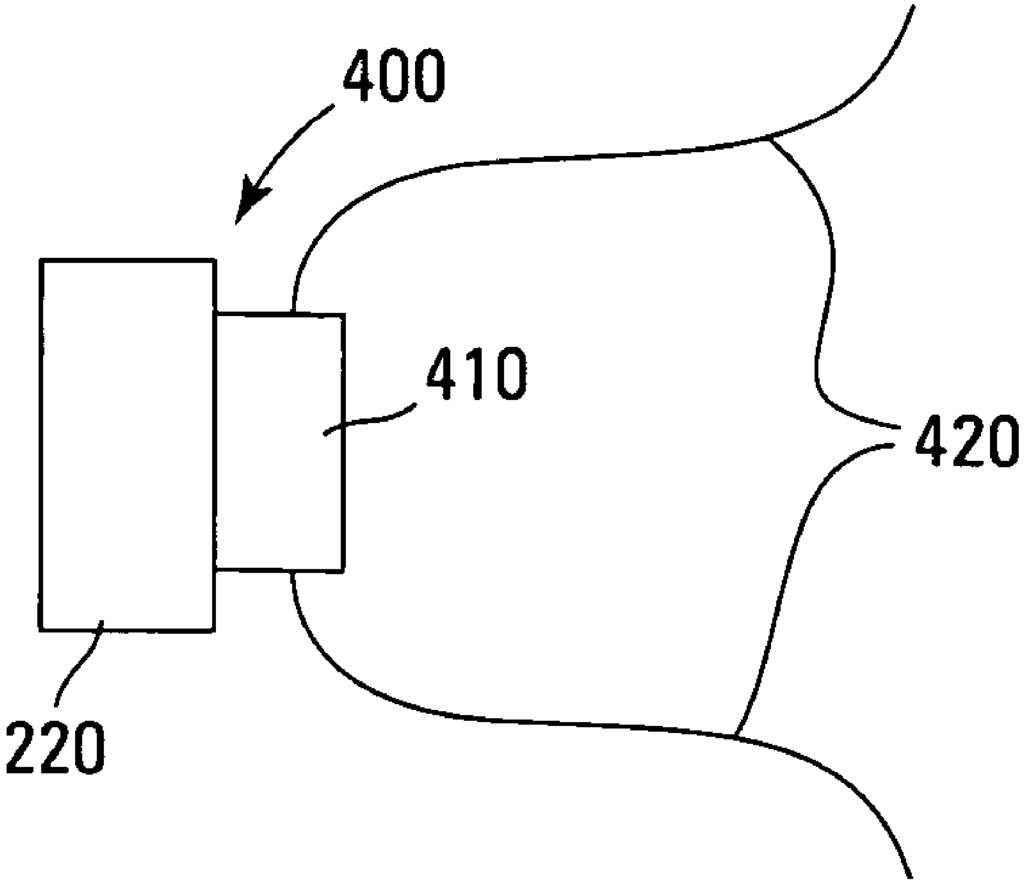
FIG. 4 shows an embodiment of a portion of a heating element, according to another embodiment of the disclosure.

FIG. 4 shows heat-conducting plate 220, as a portion of a heating element 400, as a portion of marker 225, with conduit 230 removed, according to another embodiment. For one embodiment, heating element 400 includes a resistor 410 is conductively coupled to heat-conducting plate 220. For one embodiment, resistor 410 is in direct contact with heat-conducting plate 220. For another embodiment, a heat conducting grease may be disposed between resistor 410 and heat-conducting plate 220. Wires 420 are electrically coupled to resistor 410 and are routed through conduit 230, as shown in FIG. 3, and are connected to a power source, e.g., power supply 130 of FIG. 1, such as a DC power source. Alternatively, heating wire may be embedded in heat-conducting plate 220.

In operation, replaceable component 122 is inserted into the imaging device, and replaceable component 122 engages heat-conducting plate 220, and moves heat-conducting plate 220 along with conduit 230 into housing 230 while compressing spring 260, as illustrated in FIG. 3. This continues until replaceable component 122 abuts an exterior portion of housing 230 surrounding hole 244. At this point, spring 260 exerts a force against stop 250 (FIG. 3), thereby pushing plate 220 against replaceable component 122.

For one embodiment, when replaceable component 122 reaches the predetermined state discussed above, plate 220 is heated by dissipating electrical energy in resistor 410 (FIG. 4). This causes plate 220 to soften the portion of replaceable component 122 in contact with plate 220 so that this portion of replaceable component 122 deforms under the force exerted by spring 260. For one embodiment, plate 220 is heated above a glass transition temperature of the portion of replaceable component 122 contacting plate 220. For other embodiments, plate 220 may be heated to lower temperatures than the glass transition temperature sufficient to provide adequate deformation of replaceable component 122. For another embodiment, heating plate 220 causes localizes melting adjacent the deformation.

Figure 5:
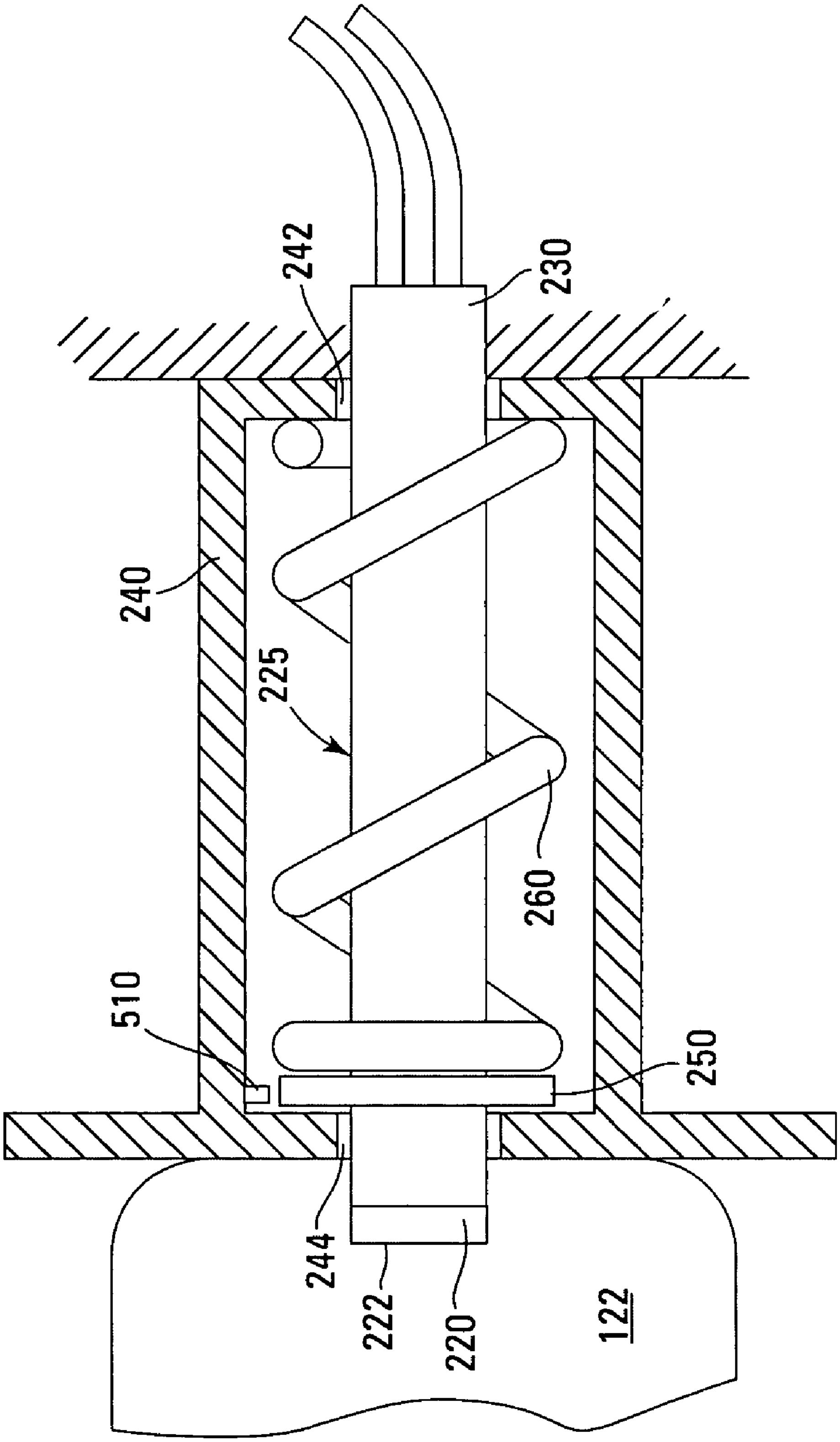
FIG. 5 shows an embodiment of a marking device in operation, according to another embodiment of the disclosure.

In other embodiments, plate 220 is heated to a temperature above the melting temperature of the portion of replaceable component 122 to intentionally melt a mark, such as a bubble portion, or a depression into replaceable component 122. For some embodiments, melting causes marker 225, to move into the replaceable component 122 as it melts in contact with plate 220, as shown in FIG. 5. Melting and the movement of plate 220 into the body proceeds until stop 250 abuts the interior portion of housing 240 surrounding hole 244, as shown in FIG. 5. For one embodiment, a sensor 510, such as an optical sensor, detects when stop 250 abuts the interior portion of housing 240, and sends a signal to a controller, such as controller 110 of FIG. 1, that stops the power supplied to resistor 410 in response to the signal from sensor 510. For another embodiment, the controller stops supplying power to resistor 410 after a predetermined time that corresponds to when stop 250 abuts the interior portion of housing 240.

For one embodiment, stop 250 acts as a heat sink that conducts heat away from plate 220 to reduce undesirable extraneous heating and thus deformation and/or melting. Note that the location of stop 250 on conduit 230 substantially determines the extent of the melting, for melting embodiments, and thus the extent to which plate 220 penetrates the body of replaceable component 122. Moreover, stopping the power and/or conducting the heat from plate 220 to stop 250, acts further determine the extent of the melting.

When replaceable component 122 is removed, there is a depression in the body where the melting occurred, which serves as an identifier indicative that replaceable component 122 reached the predetermined state. For one embodiment, heat-conducting plate 220 may include a symbol on its leading face 222 (FIG. 5) that gets imprinted at a base of the depression.

For an alternative embodiment, resistor 410 (FIG. 4) may be brought into direct contact with replaceable component 122 without using heat-conducting plate 220. For one embodiment, resistor 410 may be spring loaded for biasing resistor 410 directly against replaceable component 122. For another embodiment, resistor 410 may be configured so that gravitational force biases resistor 410 directly against replaceable component 122. Locating resistor 410 vertically above replaceable component 122 and weighting resistor 410 may accomplish this.

Figure 6:
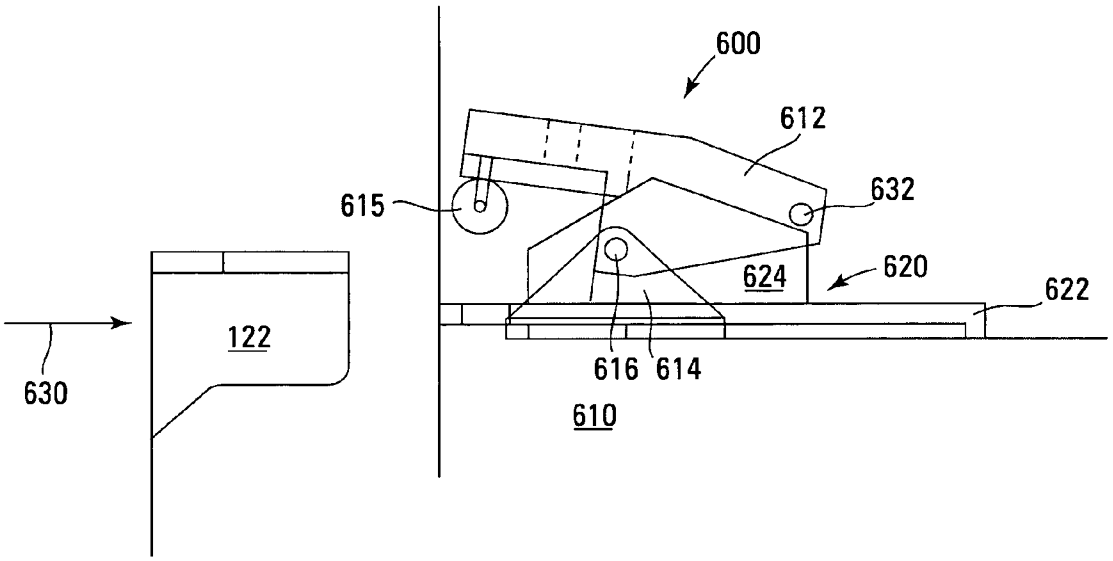
FIG. 6 is a side view of an embodiment of a marking device, according to another embodiment of the disclosure.

FIG. 6 is a side view illustrating a portion of an imaging device, such as imaging device 100 of FIG. 1, receiving a portion of replaceable component 122, according to another embodiment. The imaging device includes a marking device 600. Marking device 600 includes a lever 612 configured as a cam follower. Lever 612 is pivotally connected to a portion 610 of the imaging device, such as a print engine, by a pivot block 614 and a pin 616. A marker 615 that may be a resistor, such as resistor 410 of FIG. 4, or similar to marker 225 of FIG. 2 is connected to lever 612. A cam 620 includes a slider 622 that is slidably attached to the portion 610. A lobe 624 of cam 620 is connected to slider 622, as shown in FIG. 6.

Figure 7:
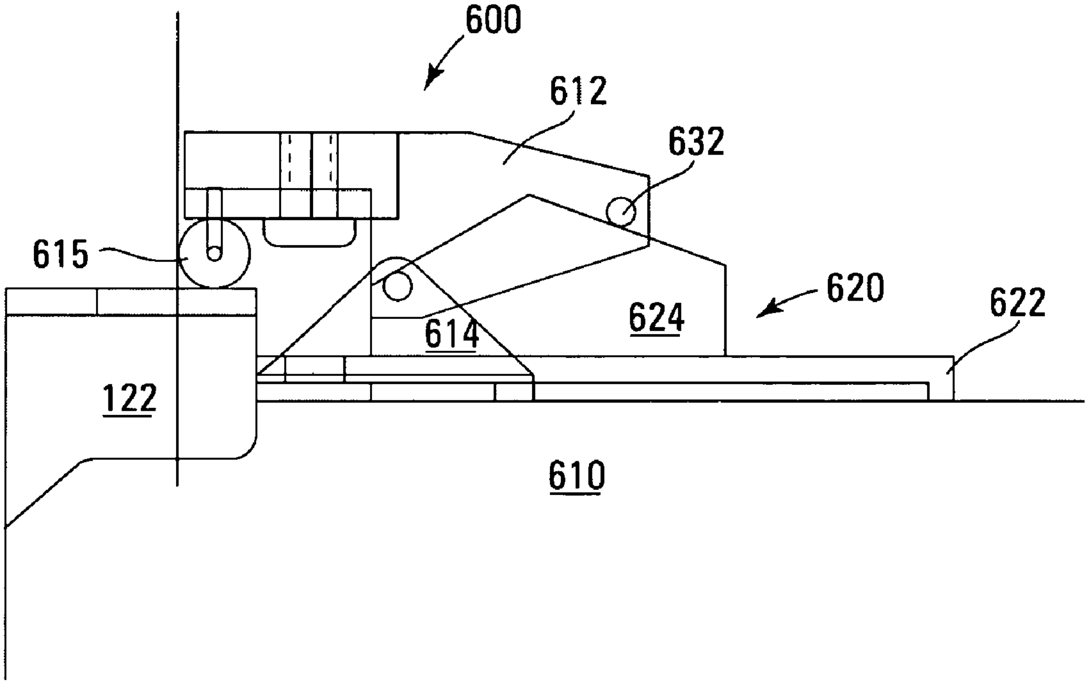
FIG. 7 is a side view of the marking device of FIG. 6 during operation, according to another embodiment of the disclosure.

As replaceable component 122 is inserted into the imaging device, it engages slider 622 and moves cam 620 in the direction of the arrow 630. This moves lobe 624 against a protrusion 632 protruding from lever 612. Lever 612 pivots marker 615 into contact with replaceable component 122 in response to lobe 624 moving against a protrusion 632, as shown in FIG. 7. For one embodiment, moving lobe 624 against a protrusion 632 causes marker 615 to forcibly contact the body of replaceable component 122.

When replaceable component 122 reaches the predetermined state, marker 615 is activated as described above. Activation of marker 615 causes marker 615 to produce a mark in replaceable component 122.

Figure 8:
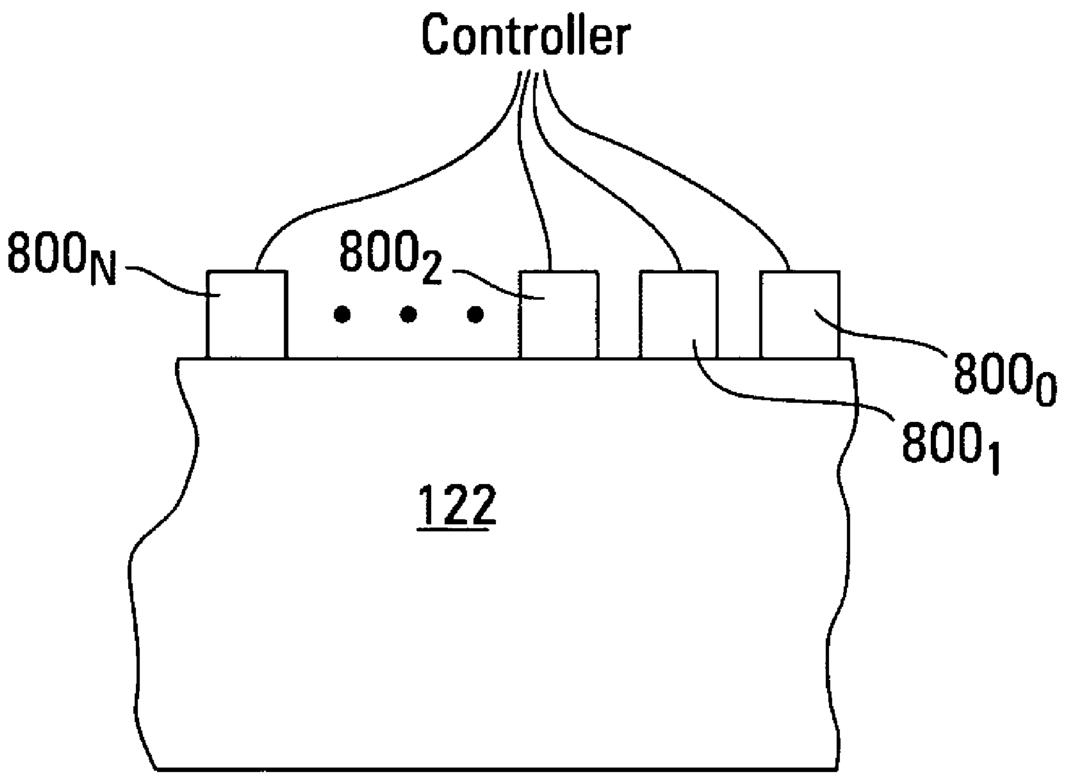
FIG. 8 is a block diagram of a portion of an embodiment of an imaging device, according to another embodiment of the disclosure.

FIG. 8 is a block diagram of a portion of an imaging device, such as imaging device 100 of FIG. 1, with replaceable component 122 installed therein, according to another embodiment. The imaging device includes a plurality of marking devices 800, each of which may be similar to marking device 200 of FIG. 2 or marking device 600 of FIG. 6 for one embodiment. For another embodiment, each of the marking devices 800 produces a mark in the body of replaceable component 122 in response to instructions from a controller, such as controller 110 of FIG. 1, e.g., or more specifically local logic 112.

For one embodiment, one of the marking devices 800, e.g., marking device $\mathbf{800}_0$, produces a mark in replaceable component 122 when replaceable component 122 is at an initial state prior to initial operation of replaceable component 122 within the imaging device, e.g., when replaceable component 122 is new and is initially installed. Subsequently, the remaining marking devices 800, e.g., marking devices $\mathbf{800}_1$ to $\mathbf{800}_N$, respectively produce marks in replaceable component 122 at different threshold percentage states of replaceable component 122, such as percentage of a useful, limited and/or operable lifetime of replaceable component 122. For example, the threshold percentage states may respectively correspond to different amounts (or percentages of a total amount) of marking material within replaceable component 122 or different amounts (or percentages of a total acceptable amount) of wear (or different worn states) of one or more components of replaceable component 122 or both. For a more specific, example, marking device $\mathbf{800}_1$ may produce a mark in replaceable component 122 when the amount of marking material and/or wear is a percentage of the amount of marking material and/or wear that occurs at a predetermined final state of replaceable component 122, such as an end of its useful, limited and/or operable lifetime. The remaining marking devices 800, e.g., marking devices $\mathbf{800}_2$ to $\mathbf{800}_N$, respectively produce marks in replaceable component 122 at increasing percentages until marking device $\mathbf{800}_N$ forms a mark corresponding to the predetermined final state of replaceable component 122. Note that for some embodiments, replaceable component 122 may be removed at any time and that the number of marks in replaceable component 122 indicate the state of replaceable component 122 at which it was removed.

CONCLUSION

Although specific embodiments have been illustrated and described herein it is manifestly intended that the scope of the claimed subject matter be limited only by the following claims and equivalents thereof.

What is claimed is:

1. A method comprising:

directly and physically contacting a surface of a portion of a replaceable component installed in an imaging device with a surface of a portion of a heated object; and selectively deforming or melting the portion of the replaceable component with the portion of the heated object directly and physically contacting the surface of the portion of the replaceable component, wherein the replaceable component remains operable after selectively deforming or melting the portion of the replaceable component.

2. The method of claim 1, wherein selectively deforming or melting the portion of the replaceable component occurs upon occurrence of a predetermined state.

3. The method of claim 2, wherein the predetermined state corresponds to a useful, limited and/or operable lifetime of the replaceable component.

4. The method of claim 2, further comprising sensing the predetermined state before selectively deforming or melting the portion of the replaceable component.

5. The method of claim 2, wherein the predetermined state of the replaceable component corresponds to an initial state prior to initial operation of the replaceable component.

6. The method of claim 2, wherein the predetermined state of the replaceable component corresponds to the replaceable component reaching an end of its warranty period.

7. The method of claim 2, wherein the predetermined state of the replaceable component corresponds to a percentage of a condition that occurs at a predetermined final state of the replaceable component.

8. The method of claim 1, wherein selectively deforming or melting the portion of the replaceable component is in response to instructions from logic located remotely of the imaging device.

9. The method of claim 1, wherein directly contacting the portion of the replaceable component with a heated object comprises forcing a heated plate against the surface of the portion of the replaceable component.

10. The method of claim 1, wherein selectively deforming or melting the portion of the replaceable component includes selectively deforming or melting a body of the replaceable component.

11. The method of claim 1, wherein the heated object is configured to directly and physically contact the replaceable component when the replaceable component is installed in the imaging device.

12. The method of claim 1, wherein selectively deforming or melting the portion of the replaceable component occurs while the replaceable component is installed in the imaging device.

13. A method of operating an imaging device, comprising:

forcibly engaging a surface of a portion of a replaceable component installed in the imaging device into direct physical contact with a surface of a portion of a marker; and when the replaceable component is at a predetermined state, heating the marker to deform or melt the portion of the replaceable component with the portion of the maker in direct physical contact with the surface of the portion of the replaceable component, wherein the replaceable component remains operable after deforming or melting the portion of the replaceable component.

14. The method of claim 13, wherein forcibly engaging a surface of a portion of a replaceable component installed in the imaging device into direct physical contact with a surface of a portion of a marker comprises forcibly engaging the surface of the portion of the replaceable component into direct physical contact with a plate.

15. The method of claim 14, wherein heating the marker comprises dissipating electrical power in a resistor thermally coupled to the plate.

16. The method of claim 13, wherein the predetermined state corresponds to an amount of contents within the replaceable component or an amount of wear of the replaceable component or both.

17. The method of claim 13, wherein heating the marker is in response to a signal indicative of the predetermined state.

18. The method of claim 13, wherein heating the marker is triggered by logic located remotely of the imaging device.

19. The method of claim 13, wherein heating the marker to deform or melt the portion of the replaceable component includes heating the marker to deform or melt a body of the replaceable component.

20. The method of claim 13, wherein the marker is configured to directly and physically contact the replaceable component when the replaceable component is installed in the imaging device.

21. The method of claim 13, wherein heating the marker comprises heating the marker while the replaceable component is installed in the imaging device.

22. An imaging device comprising:

at least one marker having a surface configured to directly and physically contact a surface of a portion of a replaceable component installed in the imaging device, wherein the at least one marker is configured to selectively deform or melt the portion of the replaceable component when the replaceable component is at a predetermined state, when the surface of the at least one marker is in direct physical contact with the surface of the portion of the replaceable component, and when the at least one marker is heated, wherein the replaceable component remains operable after selectively deforming or melting the portion of the replaceable component.

23. The imaging device of claim 22, wherein a biasing device causes the marker to forcibly engage the surface of the portion of the replaceable component.

24. The imaging device of claim 22, wherein the marker comprises a plate that forcibly engages the surface of the portion of the replaceable component.

25. The imaging device of claim 22, wherein the imaging device comprises local logic configured to control the marker.

26. The imaging device of claim 25 further comprises a sensor coupled to the local logic for sensing when the marker is to deform or melt the portion of the replaceable component.

27. The imaging device of claim 25 wherein the local logic is configured to receive information from remote logic located remotely of the imaging device.

28. The imaging device of claim 22 further comprises a plurality of markers, the markers configured to respectively deform or melt respective portions of the replaceable component when heated and in direct physical contact with the respective portions of the replaceable component.

29. The imaging device of claim 22, wherein the portion of the replaceable component includes a body of the replaceable component.

30. The imaging device of claim 22, wherein the at least one marker is configured to directly and physically contact the replaceable component when the replaceable component is installed in the imaging device.

31. The imaging device of claim 22, wherein the at least one marker is configured to selectively deform or melt the portion of the replaceable component while the replaceable component is installed in the imaging device.

* * * * *

UNITED STATES PATENT AND TRADEMARK OFFICE

CERTIFICATE OF CORRECTION

PATENT NO. : 7,555,229 B2
APPLICATION NO. : 11/236938
DATED : June 30, 2009
INVENTOR(S) : David R. Kendall et al.

It is certified that error appears in the above-identified patent and that said Letters Patent is hereby corrected as shown below:

In column 6, line 56, in Claim 13, delete “maker” and insert -- marker --, therefor.

Signed and Sealed this

Seventeenth Day of November, 2009

David J. Kappos

*Director of the United States Patent and Trademark Office*